Jan. 10, 1928.
C. R. SODERBERG
1,655,901
FLEXIBLE GEAR WHEEL
Filed Dec. 23, 1924.
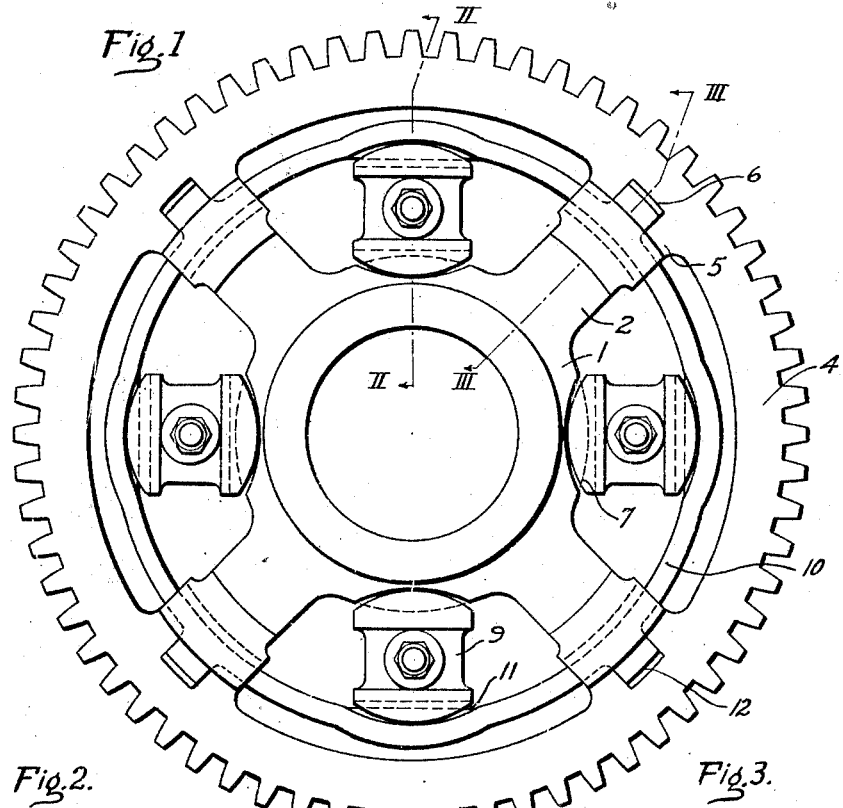
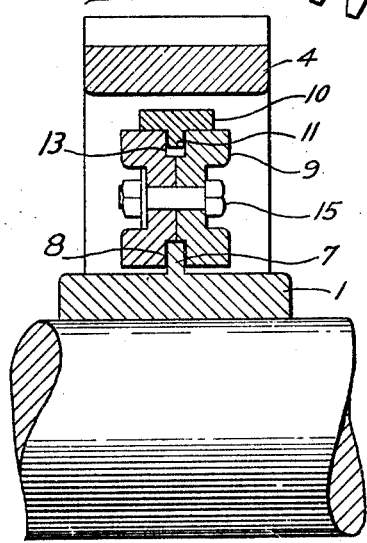
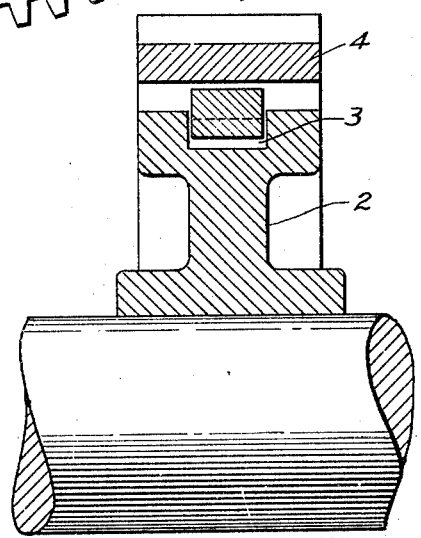
WITNESSES:
INVENTOR
Carl Richard Soderberg.
BY
*Wesley G. Carr*
ATTORNEY Patented Jan. 10, 1928.

1,655,901

UNITED STATES PATENT OFFICE.

CARL RICHARD SODERBERG, OF WILKINSBURG, PENNSYLVANIA, ASSIGNOR TO WESTINGHOUSE ELECTRIC & MANUFACTURING COMPANY, A CORPORATION OF PENNSYLVANIA.

FLEXIBLE-GEAR WHEEL.

Application filed December 23, 1924. Serial No. 757,591.

My invention relates to flexible elements, more particularly to gear wheel constructions embodying spring elements of novel form which function to absorb and to deflect the shock or impact transmitted to the gear teeth.

It is among the objects of my invention to provide a flexible element which shall be of simple, compact and durable mechanical construction.

It is still a further object of my invention to provide a flexible element which shall have an unusual degree of resilience and an extraordinary capacity for the amount of spring material utilized by virtue of its inherent design and the nature of its application.

There are innumerable types of yielding connections for flexible gear wheels, couplings, and the like which embody different kinds of spring elements. The nature and design of the spring members vary in accordance with the operating conditions to which they are applied, namely, in accordance with the torsional deflection or strength requisite in the particular application. For this purpose, coil springs and leaf springs have been utilized, their manner of application differing as to the disposition of the spring members and the manner of mounting them.

My present invention is directed to a flexible element which may be utilized in a coupling or gear wheel construction in which the spring constitutes a unitary substantial annular shape member which is engaged in such manner as to transmit the torque through the spring body and to provide deflections in such directions as are desirable for the purpose of carrying out the invention.

My invention comprises a flexible element consisting of a pair of complementary members such as a hub and rim, the latter being a part of a coupling flange or the toothed rim of a gear wheel which is adapted to engage a driving pinion member of a motor or the like. A spring element of substantially annular shape is interposed between the hub and rim portion and secured thereto in such manner as to transmit the available torque from the rim or hub through the spring member to the complementary hub or rim portion.

By reason of the efficient utilization of the available space for the springs and the method of loading the springs, the flexible gear will be able to absorb an unusually great amount of potential energy for a relatively low stress of the spring material.

In the accompanying drawing constituting a part hereof and in which like reference characters designate like parts:

Figure 1 is a side elevational view of a flexible element embodying the principles of my invention, Fig. 2 is a view in cross section taken along the line II—II of Fig. 1, and Fig. 3 is a similar view taken along the lines III—III of Fig. 1.

Referring to Fig. 1 of the drawing, the structure therein illustrated comprises a hub portion 1 having a plurality of radial spokes 2 extending thereon which are provided with slots 3, Fig. 3. A rim member 4 having radial projections 5 which are provided with slotted openings 6 extending coaxially with the hub portion is mounted on the spoke members 2 as shown. The hub member is provided with projecting tongues 7 intermediate the spokes 2 which are adapted to fit into recesses 8, Fig. 2, in a plurality of roller blocks 9 which are disposed intermediate the spoke members.

A substantially annular spring element 10 having inwardly projecting tongues 11 and radially projecting pads 12 is interposed between the spokes and rim 2 and 4 respectively, with the tongues 11 engaging slots 13 of the roller blocks 9 of Fig. 2, and the pads 12 engaging the slotted openings 6 of the rim 4.

The roller blocks 9 are split members which are joined by bolts 15 to engage the tongues 7 and 11 of the hub and springs 1 and 10 respectively, and in this clamped position the blocks 9 are maintained in proper working alignment with the hub and spring members.

The projecting pads 12 on the spring element function to transmit torque through the spring member from the rim 4 and the spring member 10 is actuated from the hub element through the roller blocks 9 by virtue of their slotted engagements with the spring and hub.

The operation of this device is briefly as follows: The hub member 1 is mounted on a shaft or axle and the rim portion may be similarly secured. If the latter constitutes a gear rim as shown in Fig. 1, it will be co-operatively engaged with a driving element such as a pinion member. The torque is transmitted from the hub to the rim through the roller blocks 9 and the spring element 10, by virtue of the pad engagement of the spring member 10 with the notches 6 of the rim.

It is obvious that the characterstic of the flexible gear will be determined by the relative curvatures of the rolling blocks 9 and the engaging surfaces of the hub member 1 and the spring member 10. This is a very valuable feature when the same type of gears are supplied for different applications. If high frequency vibrations are to be transmitted, a lower flexibility of the gear may be permitted, corresponding to a fairly small curvature of the rolling surfaces. If the gear has to transmit low frequency vibrations, however, it is necessary that the flexibility be as great as possible. This is attained by shaping the rolling surfaces into a greater curvature. As the curvature of the rolling surfaces increases the maximum stress of the springs will increase for constant torque. Naturally, the maximum curvature that can be used is determined by the maximum allowable stress in the springs.

In the drawing I have shown an embodiment of my invention utilizing four roller blocks. It is obvious that the stress conditions of the circular spring are more favorable for a greater number of blocks, because a greater component of the stress is pure tension. The ideal construction in this respect is a series of spherical balls between two annular rings, giving an arrangement resembling a ball bearing. The construction described above is preferred for flexible gears, and similar applications, however.

It is evident from the foregoing description of my invention that flexible elements made in accordance therewith provide an inexpensive, compact, durable and mechanically efficient drive member either for coupling application or as constituting a flexible gear element and that this type of spring design is especially applicable for heavy duty work.

Although I have described a specific embodiment of my invention, it will be obvious to those skilled in the art that various modifications may be made in the details of construction and the size and proportion of the several cooperating parts and the manner of applying the design to various applications without departing from the principles herein set forth.

I claim as my invention:—

1. A flexible element comprising a hub portion and a rim portion, a substantially annular spring element interposed therebetween, said spring element having means for positively engaging said rim portion and roller blocks between said spring and hub member for transmitting torque therebetween.

2. A flexible element comprising a hub portion and a rim portion, a substantially annular metallic spring element interposed therebetween, said spring element having projections for positively engaging said rim portion and roller blocks between said spring and hub member for transmitting torque therebetween.

3. A flexible element comprising a hub portion, a rim portion, a substantially annular spring element interposed between said hub and rim portion and movable blocks interposed between said spring and the said hub, said spring having functionally integral projections for engaging said rim portion and said blocks.

4. A flexible element comprising a hub having radial spokes, a rim mounted on the spokes of said hub, a spring disposed between said rim and spokes and movable blocks disposed between said spring and hub, said spring having lateral projections for engaging said rim and said blocks.

5. A flexible element comprising a hub having radial spokes, a rim mounted on the spokes of said hub, a spring disposed between said rim and spokes, a plurality of blocks interposed between said rim and hub, and means for maintaining said hub, rim, springs and blocks in working alinement, said means comprising radial tongues projecting on said spring which are disposed in slots of said rim and tongues projecting on said spring and hub for engaging said blocks.

6. A flexible element comprising a hub having radial spokes and tongues projecting intermediate said spokes, a rim mounted on the spokes of said hub having slotted openings, a unitary spring interposed between said spokes and rim and having projecting tongues for engaging the slotted openings of said rim and roller blocks interposed between said spring and hub, said blocks having grooves for engaging the spring and the tongues of said hub.

7. A flexible element comprising a hub portion and a rim portion, said hub having radial spokes slotted at their ends and tongues intermediate said spokes and said rim having slots in alinement with said spokes, a spring member disposed in the slots of said spokes having projections for engaging the slots of said rim and roller blocks engaging the tongues of said hub and the said spring.

In testimony whereof, I have hereunto subscribed my name this 12th day of December, 1924.

CARL RICHARD SODERBERG.